I. EDELMAN.
WATER CLOSET.

No. 26,944. Patented Jan. 24, 1860.

Witnesses:
Henry Howson
Horace Lee

Inventor
Isaac Edelman

UNITED STATES PATENT OFFICE.

ISAAC EDELMAN, OF PHILADELPHIA, PENNSYLVANIA, ASSIGNOR TO G. W. EDELMAN, OF SAME PLACE.

WATER-CLOSET.

Specification of Letters Patent No. 26,944, dated January 24, 1860.

*To all whom it may concern:*

Be it known that I, ISAAC EDELMAN, of the city and county of Philadelphia and State of Pennsylvania, have invented a new and useful Improvement in Water-Closets; and I do hereby declare the following to be a full, clear, and exact description of the same, reference being had to the accompanying drawing and to the letters of reference marked thereon.

My invention consists in the arrangement of a three way cock having its plug central with the hinge of the lid of the water closet, and a vessel with certain pipes fully described hereafter, the whole forming a simple and effective arrangement for admitting the water to and shutting it off from the basin.

My invention further consists in a peculiar arrangement of a notched pipe and plate arranged within the basin for discharging the water into the latter in a thin stream which has a thoroughly cleansing effect.

In order to enable others to make and use my invention I will now proceed to describe its construction and operation.

Figure 1:
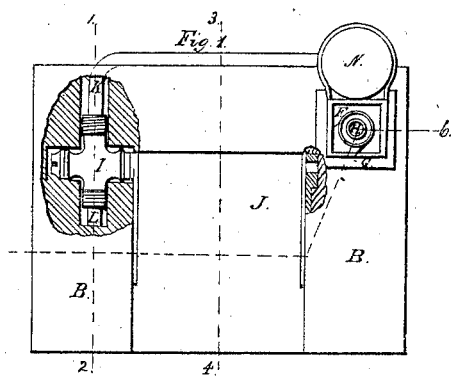
Figure 2:
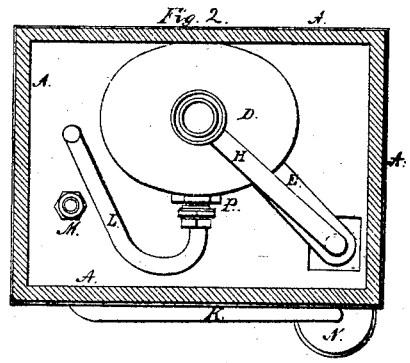
Figure 3:
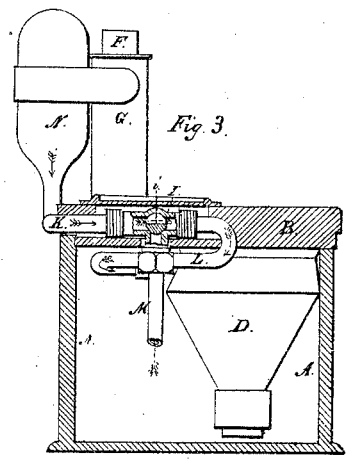
Figure 4:
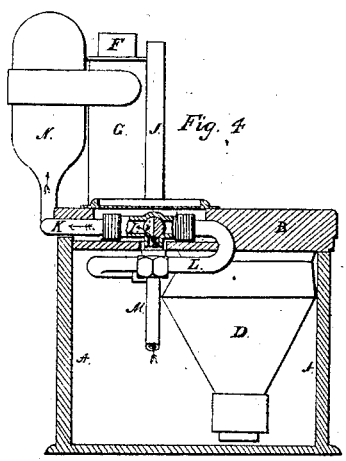
Figure 5:
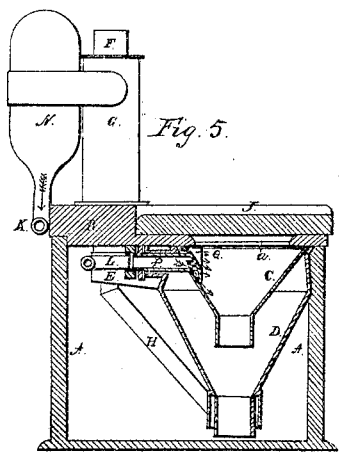
Figure 6:
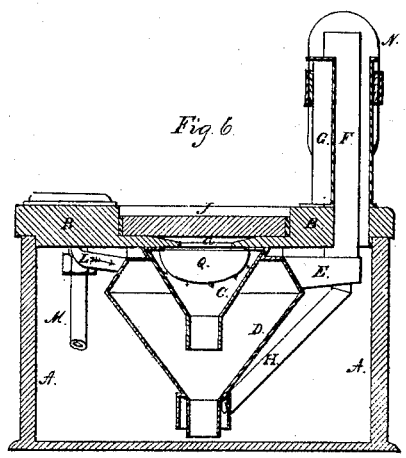

On reference to the accompanying drawing which forms a part of this specification, Figure 1, is a plan view of my improved water closet. Fig. 2, the same with the top removed. Fig. 3, a section on the line 1, 2, Fig. 1. Fig. 4, the same with the plug of the cock in a position differing from that shown in Fig. 3. Fig. 5, a vertical section on the line 3, 4, Fig. 1. Fig. 6, a vertical section on the line 5—6 Fig. 1, and Fig. 7, a detached view of the end of the discharge pipe Similar letters refer to similar parts throughout the several views.

The seat of the water closet consists of the box A, its cover B, the latter having the hinged lid J, and the usual opening *a*, beneath which is secured the basin C situated within the casing D.

The space between the basin and casing communicates through a passage E with a vertical pipe F inclosed within an exterior pipe G which communicates with the external air or with any adjacent flue.

A pipe H communicates with the pipe through which the soil passes from the basin to the well, and also with the vertical pipe F.

The above described arrangement of pipes is similar to that described in the patent granted to G. W. Edleman, Jr., as my assignee, on the twenty fourth day of August 1858, and is used for a similar purpose, namely, the ventilation of both basin and well pipe, so as to prevent the effluvia from passing into the room in which the closet is situated.

I is an ordinary three way cock, let into a recess in the top B of the box, and so situated that its plug *i* shall be central with the hinge of the lid J and shall be turned on the raising and lowering of that lid. This cock I has three branches, one being connected to the pipe K the other to the pipe L, and the third to the pipe M.

The pipe K communicates with a vessel N situated at a suitable height above and distance from the seat.

The pipe L communicates with the basin, and M is the supply pipe. The pipe L is connected to and communicates with a tube P which passes through the outer casing D and projects into the basin C, the projecting end of the pipe fitting against the back of the plate Q which is so secured to the basin that its lower end is in close contiguity to, but not in actual contact with the back of the basin.

Figure 7:

The end of the tube P where it fits against the plate has a number of notches best observed on reference to Fig. 7, for a purpose which will be described hereafter.

When the lid J of the closet is raised the plug *i* of the three way cock I occupies the position shown in Fig. 4, so that the water passing through the supply pipe M can enter the vessel or reservoir N which it nearly fills. When the lid is depressed however the plug assumes the position shown in Fig. 3, when the passage of the supply pipe M is closed and the water which had entered the vessel N, rushes from the latter through the cock and through the pipe L and tube P into the basin.

The air in the vessel N having been more or less compressed by the force of the water which entered it when the lid was raised, this compressed air will serve to inject the supply of water into the basin with considerable force when the lid J is down.

The supply of water for cleansing the basin will depend upon the size of the vessel N which together with its pipe and the three way cock is entirely emptied, on the depression of the lid so that no water remains to freeze in cold weather and interfere with the proper action of the three way cock and its appendages.

The end of the tube P bearing against the back of the plate Q the water must pass through the notches on the inclined end of the tube and thus be dispersed in jets against the back of the plate, between the lower edge of which and the basin it escapes in a thin stream which passes with considerable force around the inside of the basin and effectually cleanses the same.

I do not claim broadly the employment of a three way cock operated by the lid of a water closet so as to admit and shut off the supply of water; but

I claim as my invention and desire to secure by Letters Patent—

1. The arrangement of the three way cock I having its plug central with the hinge of the lid J, the vessel M, and pipes K, L and M.

2. The tube P with its notched end, in combination with the plate Q, arranged within the basin as set forth for the purpose specified.

In testimony whereof, I have signed my name to this specification in the presence of two subscribing witnesses.

ISAAC EDELMAN.

Witnesses;
HENRY HOWSON,
CHARLES D. FREEMAN.